United States Patent
McCallum

(10) Patent No.: US 7,308,468 B2
(45) Date of Patent: Dec. 11, 2007

(54) PATTERN MATCHING

(75) Inventor: Ian D. McCallum, West Barrie (CA)

(73) Assignee: Intel Corporation, Santa Clara, CA (US)

( * ) Notice: Subject to any disclaimer, the term of this patent is extended or adjusted under 35 U.S.C. 154(b) by 697 days.

(21) Appl. No.: 10/748,740

(22) Filed: Dec. 30, 2003

(65) Prior Publication Data
US 2005/0144203 A1    Jun. 30, 2005

(51) Int. Cl.
   *G06F 17/15* (2006.01)
(52) U.S. Cl. .................... 708/422; 380/37
(58) Field of Classification Search ........ 708/422–426; 380/37, 42, 275
See application file for complete search history.

(56) References Cited

U.S. PATENT DOCUMENTS 4,282,403 A * 8/1981 Sakoe .................. 704/234
5,239,497 A * 8/1993 McKay et al. .......... 708/422
6,101,602 A * 8/2000 Fridrich ................. 713/176
6,792,438 B1* 9/2004 Wells et al. ............ 708/250
7,065,544 B2* 6/2006 Moreno ................. 708/422
2004/0010529 A1* 1/2004 Kasper, II .............. 708/422
2004/0098605 A1* 5/2004 Kasper, II .............. 713/200

OTHER PUBLICATIONS

Ronald L. Rivest, The MD5 Message-Digest Algorithm, Apr. 1992, MIT Laboratory for Computer Science and RSA Data Security, Inc., Network Working Group Request for Comments: 1321.*

* cited by examiner

*Primary Examiner*—Chat C. Do
(74) *Attorney, Agent, or Firm*—Buckley, Maschoff & Talawalkar LLC

(57) ABSTRACT

Systems, apparatuses, and methods for searching for a match to a sequence of bits. The systems apparatuses, and methods include selecting a sequence of bits from a data stream, taking a function of the sequence of bits having a result that is a pattern that is represented by shorter string of bits, and comparing the resulting pattern to a predefined pattern to determine whether the resulting pattern matches the predefined pattern.

21 Claims, 5 Drawing Sheets

Data Stream Search

Method of Using a Strand Sub-Table Node

PATTERN MATCHING

BACKGROUND

Contemporary processors are generally able to process information more quickly than they are able to read from memory. In string matching, a processor determines whether a data stream or a portion of a data stream matches one or more predefined patterns. That data stream may, for example, be a data stream entering a computer node from a remote computer node. The predefined patterns may, for example, indicate that a virus or other undesirable code is present in the data stream and there may be very many such patterns to be compared to the data stream. Those patterns may therefore be stored in memory and processor access to those patterns to perform pattern comparison and matching may slow the process of searching for pattern matches.

BRIEF DESCRIPTION OF THE DRAWINGS

The accompanying drawings, wherein like reference numerals are employed to designate like components, are included to provide a further understanding of pattern matching, are incorporated in and constitute a part of this specification, and illustrate embodiments of pattern matching that together with the description serve to explain the principles of pattern matching.

In the drawings.

DETAILED DESCRIPTION

Reference will now be made to embodiments of pattern matching, examples of which are illustrated in the accompanying drawings. Details, features, and advantages of pattern matching using message digests will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification are not necessarily all referring to the same embodiment. References to "or" are furthermore intended as inclusive so "or" may indicate one or another of the ored terms or more than one ored term.

Figure 1:
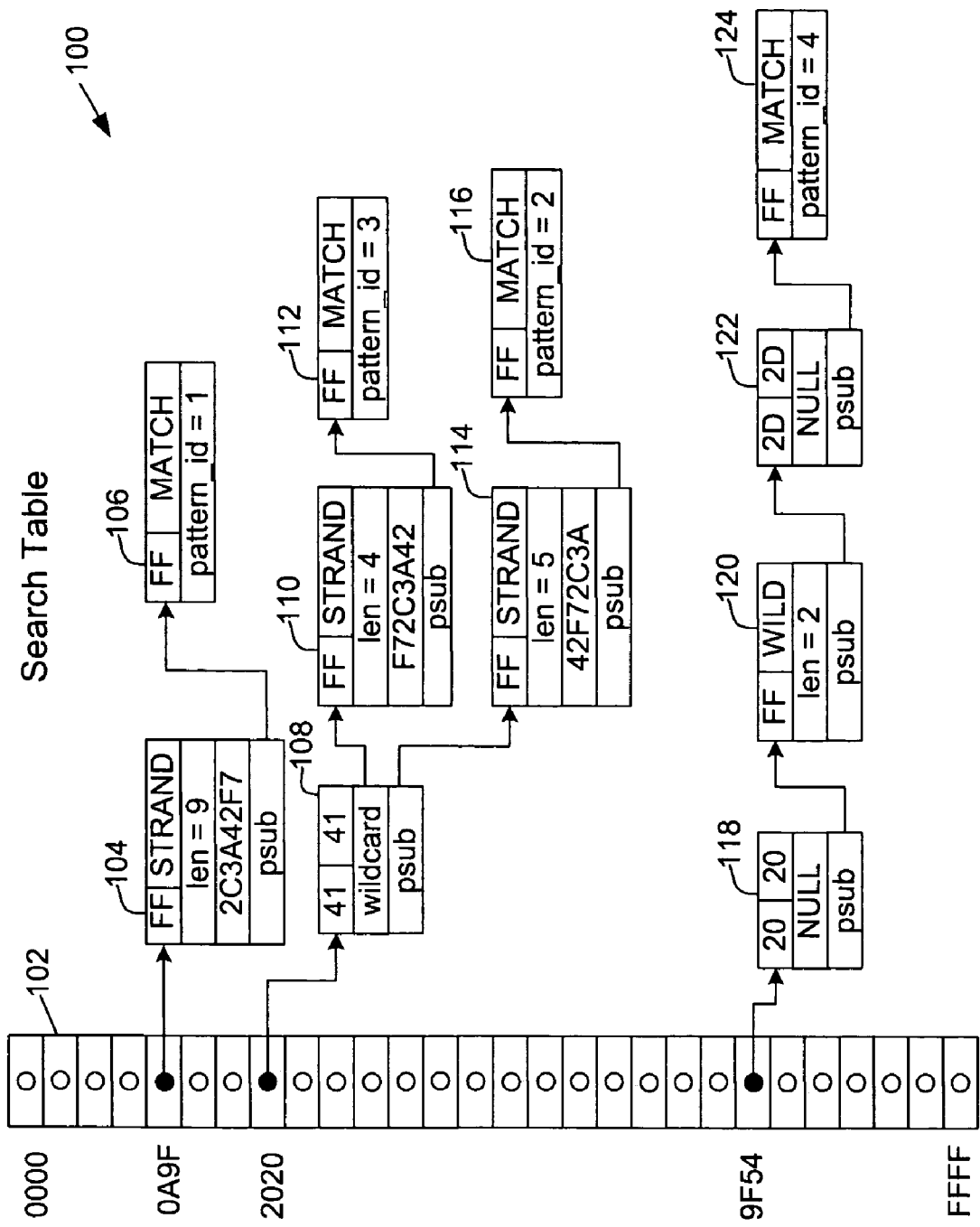
FIG. 1 illustrates an embodiment of a search table.

FIG. 1 illustrates an embodiment of a search table 100 in which data streams may be matched to predefined patterns using a message digest function or another function. Those data streams may be internal data streams or streams passed from one node in a network to another node in the network.

Nodes coupled to networks typically communicate by passing information represented by sets of binary values from one node to another. Those binary values may represent many types of information including, for example, numbers, letters, other characters, graphics, images, video, voice and other acoustic information, and combinations of those things. Information, such as the information contained in the data stream, may comprise any data capable of being represented as a signal, such as an electrical signal, optical signal, acoustical signal and so forth. Examples of information in this context may include voice and acoustic data, graphics, images, video, text and so forth.

The binary values may, furthermore, be grouped in a variety of ways for transmission over the network. For example, on the Internet, information in the form of bits may be grouped in packets such as Internet Protocol (IP) packets or Asynchronous Transfer Mode (ATM) cells. Internet Protocol, or IP, is a packet based protocol for use with, for example, X.25, frame-relay, and cell-relay based networks. The Internet Protocol is defined by the Internet Engineering Task Force (IETF) standard 5, Request for Comment (RFC) 791 (referred to as the "IP Specification"), adopted in September, 1981 and available from www.ietf.org.

Communications over telephone lines may be transmitted using Time Division Multiplexing. Time Division Multiplexing, or TDM, is a method by which digital information may be transmitted over, for example, a Public Switched Telephone Network (PSTN). A PSTN is a collection of networks operated, for the most part, by telephone companies and administrational organizations.

The binary values are usually held in bits having two states that are often represented by on and off or 1 and 0 values respectively. Those bits may further be grouped by, for example, a processor or a communication bus within a node regardless of the way they were packaged for transmission between nodes. Thus, for example, a certain processor may operate using 32-bit words or sets of bits that are 32-bits in length. The examples illustrated herein operate on bits in groups, or bytes, containing eight bits. The bits contained in such an 8-bit byte may furthermore be viewed as a pair of hexadecimal, or 4-bit values, which may be counted out using the numerals 0-9 and the letters A-F to represent values of 0-15. The present systems, apparatuses, and methods for matching strings may, however, be applied equally to other groupings of bits and so no limitation should be applied to the groupings of bits utilized in the following examples.

Using certain processors, there is a performance penalty that occurs when accessing external memory. That penalty may include, for example, slower performance of the processor. Thus, when utilizing certain processors, possibly including the Intel® IXP2XXX series of processors, such a penalty may be encountered when accessing external memory. By using message digests to compare binary patterns, it is possible to significantly reduce the number of memory accesses required by a processor as well as the size of the search tables.

Certain applications executed by processors intensively or frequently compare binary patterns including, for example, virus scanning and searching applications. For example, a virus detection application may search all data streams entering a node through a coupling to a network for a match to one or more known viruses. When a sequence of bytes that matches the known virus is discovered, the virus is assumed to be found and the byte sequence may be rejected. Moreover, because so many viruses are known, the data stream may have to be searched for a match to any one of many predefined patterns that correspond to those viruses.

In searching a data stream for what may be a long sequence of bytes for a match to one of many predefined patterns, systems, apparatuses and methods are described herein that expedite the search by matching the first few bytes of each predefined pattern and then continuing to search additional bytes only when all previous bytes match a prefix, or initial bytes of at least one of the predefined patterns. In string searching, it should be recognized that the data stream is typically searched for contiguous or consecutive characters.

Following are four hexadecimal strings that will be used as examples of predefined patterns to which a data stream is to be compared to determine if any portion of that data stream matches any of those patterns. It should be noted that, in many applications, patterns may be much longer than those used in the following examples and may be hundreds of bytes long. Pattern matching using message digests may, however be exemplified by use of patterns of the lengths illustrated in the following four example predefined patterns:

1. 0A 9F 54 20 3C 29 43 A5 11 22 23;
2. 20 20 41 17 00 00 22 17;
3. 20 20 ?? 18 0A 9F 54; and
4. 9F 54 20 ?? ?? 2D;

where "?" indicates a wildcard.

The search table 100 of FIG. 1 includes a root table 102 in which the first two bytes of the predefined patterns are flagged so that any portion of the data stream that includes those flagged bytes in the order they fall in the predefined patterns can be processed for further bytes matching those predefined patterns. It should be noted that any number of bits may be included in the root table 102, but that the number of bits for each pattern to be matched in the root table may be fewer than the total number of bits in those predefined patterns so that non-matches may be recognized and eliminated quickly and efficiently. Any portion of the data stream that does not match any of the flagged bits is recognized as not matching and no more searching is performed on those segments of the data stream. Thus, the patterns "0A9F," "2020," and "9F54" indicate the beginnings of the predefined patterns defined above and any sequence of bytes in the data stream that matches any of those three root table strings may be flagged as potential matches in the root table.

The search table 100 also includes several sub-tables 104-124 to which a data stream that is found to match the prefix or beginning of a pattern in the root table 102 may be compared to determine whether a complete match exists in the data stream. The sub-tables may be structured in any way desired, but are illustrated with the following structure. The upper most line indicates a lowest value indicating a possible match in the left side and a highest-value indicating a possible match in the right side of a trie sub-table. A trie is a single-way or multi-way tree structure that may be used for retrieval of one or more elements of a pattern.

As the lowest-value should be less than or equal to the highest value in the uppermost line of the sub-tables, a highest-value that is less than the lowest value may be used to indicate a non-trie sub-table type. The highest value that may be held in a storage space in the example provided may be represented by the two hexadecimal digits FF, which is the highest value that may be held in an 8-bit byte. Thus, in the example illustrated in FIG. 1, an FF may be used as the lowest-value, with a lower valued integer stored as the highest-value, to indicate a non-trie sub-table type. Other symbols or methods may alternately be used to indicate other than a trie sub-table type. Where a non-trie sub-table type is encountered, the right side of the first row may list the type of sub-table encountered, as illustrated in the example illustrated in FIG. 1.

A "strand" sub-table, such as those shown at 104, 110, and 114, includes a sequence of bytes to be processed in a second line, a message digest value to be matched in a third line, and a link, referred to as a psub, to another sub-table in a fourth line.

A "match" sub-table, such as those shown at 106, 112, 116, and 124, may be used to finally identify a match and is commonly used as the final sub-table for a predefined pattern. The second line of a match sub-table indicates an index of a character string to be matched. That index may indicate, for example, a location in external memory from which the appropriate character string to be matched is located or simply an enumerated string identifier.

A "wildcard" sub-table, such as shown at 120, may be used to indicate that any sequence of bytes will qualify as matches for a pattern of a particular length and so that number of input bytes may be skipped before resuming matching. The second line of the wildcard sub-table indicates the number of input bytes to be skipped and the pnode indicator again links the wildcard sub-table to a next sub-table.

A "strand" sub-table 104, 110, and 114 may be used to search for a match to a long sequence of bytes represented by a shorter message digest. In using a strand sub-table, a group of contiguous bytes may be selected from the data stream. For example, in the strand sub-table 104 linked to the string 0A9F in the root table 102, nine bytes immediately following 0A9F are held in memory by the processor receiving the data stream, as indicated by the "len=9" in the strand sub-table 104. A message digest function of those nine bytes is then calculated that results in a message digest value. If that message digest value is "2C3A42F7, "0 which is shown in the strand sub-table 104, then a match has likely occurred. If the calculated message digest is not 2C3A42F7, then a match has definitely not occurred.

A strand sub-table may be created by identifying a predetermined sequence of bytes to be matched, executing a message digest function on that predetermined sequence, and storing the result. The result may then be compared to the result of the same message digest function performed on a sequence of bytes that may be a portion of the input data stream. If the message digests of the aforementioned sequences are the same, it indicates the likelihood of a pattern match, while a mismatch in message digest values indicates that a pattern match has not been found.

It should be noted that in the example used in the strand sub-table 104, the sequence of bytes from the data stream is nine bytes long and the resulting message digest is four bytes long so that the reduction in string length is marginal, however, in an actual string matching scenario, the string from the data stream may be hundreds of bytes long and the result of the message digest function may also be a four byte value. Therefore, the reduction in length of the resulting string to be matched may be very significant.

It should also be noted that by performing a message digest function on a sequence of bytes, a particular result of the message digest function may be the same for multiple different sequences of bytes however, the result of any one string, including the sought matching stream, would always be the same. Thus, after performing the message digest function, the result of the matching string will always match the strand sub-table string, the result of most other strings would likely not match the strand sub-table string, and the result of a few other strings may also match the strand sub-table string. Accordingly, a result that does not match the strand sub-table message digest indicates that there is no match, thereby likely eliminating a large number of strings from further consideration, and a result that does match the strand sub-table message digest indicates that a match may exist or that one of a few non-matching strings may have been encountered. Thus, by use of the strand sub-table search, most strings may be quickly eliminated without necessitating a match to each value of a long string of characters.

If a match is found to the strand sub-table 104, then a full string match search may be performed at a match sub-table 106. That full string search may compare each character of the data stream following the 0A9F to the matching string to determine whether the string actually matches or is a non-matching string that resulted in a matching strand sub-table result.

The root table 102 also includes a predefined pattern of 2020. That pattern matches the first two bytes of both the second and third example predefined patterns. In the second predefined pattern, the third byte has the value 41 and in the third predefined pattern, the third byte is a wildcard. Therefore, if a 2020 sequence is encountered in the data stream, the root table 102 links to a trie sub-table 108 in which a tree will link to one branch of a tree if 41 is received next in the data stream and will link to a second branch of a tree regardless of what is found in the data stream. Thus, if a 41 is discovered after the 2020 in the data stream, the trie sub-table 108 links to a strand node 110 and if a 41 or any other pattern is discovered after the 2020 in the data stream, the trie sub-table 108 links to a strand node 114. Note that both links may be followed and the search may proceed down both paths concurrently.

In the situation where a 41 is incident in the data stream after the 2020 in the data stream, and the trie sub-table 108 links to the strand sub-table 110 then, like at 104, a message digest or other function will be performed on the following characters and a match to the result of the message digest function will be sought. At 110, the message digest function is indicated to be performed on the next four bytes, and if the result of the performance of the message digest function on those four bytes is F72C3A42, then a match may have been found. If any other result is found, then a match has not been found. If a match is found at the strand sub-table 110, then a match to a received sequence of bytes that may be bytes following the 202041 sequence of pattern number three may be searched at the match sub-table 112 to assure that an exact match to the predefined pattern has been found and that no other string that gives the F72C3A42 result has been received. The bytes following the 202041 sequence may include the four bytes considered at the strand sub-table 110 and may alternately or in addition include additional characters following the four characters considered at the strand sub-table 110.

If a 41 or any other byte is discovered after the 2020 in the data stream, the trie sub-table 108 links to the strand node 114 where a message digest function is performed on the following five bytes and a determination is made as to whether the result of that message digest function is 42F72C3A. If the result of that message digest function is 42F72C3A then a match is found at the strand sub-table 114, and a match to a sequence of bytes that may be bytes following the 2020?? is searched at the match sub-table 116.

The root table 102 also includes a predefined pattern of 9F54. That pattern matches the first two bytes of the fourth example predefined pattern. When the 9F54 string is encountered in the data stream, the root table 102 links to a trie sub-table 118 in which a search of the next byte is made to determine whether it is 20. As may be seen in the first line of the trie sub-table 118, a match is made only when a minimum value of 20 is encountered and when a maximum value of 20 is encountered. Therefore, any value other than 20 that is encountered after the 9F54 string results in a mismatch and termination of the search for that portion of the data stream beginning with the 9F54 string. If, however, 20 is encountered after the 9F54 string, then the trie sub-table 118 links to a wildcard sub-table 120. At the wildcard sub-table 120, the next two bytes, as indicated by len=2 in the second line, are skipped and the matching sequence is continued at a trie sub-table 122. At the trie sub-table 122 a search of the next byte after the skipped characters is made to determine whether it is 2D. If the next byte is not 2D, then the search is again terminated. If the next two characters are 2D, however, then the search is linked to a match sub-table 124. At the match sub-table 124 the search terminates with a positive match of predetermined pattern number 4.

Figure 2:
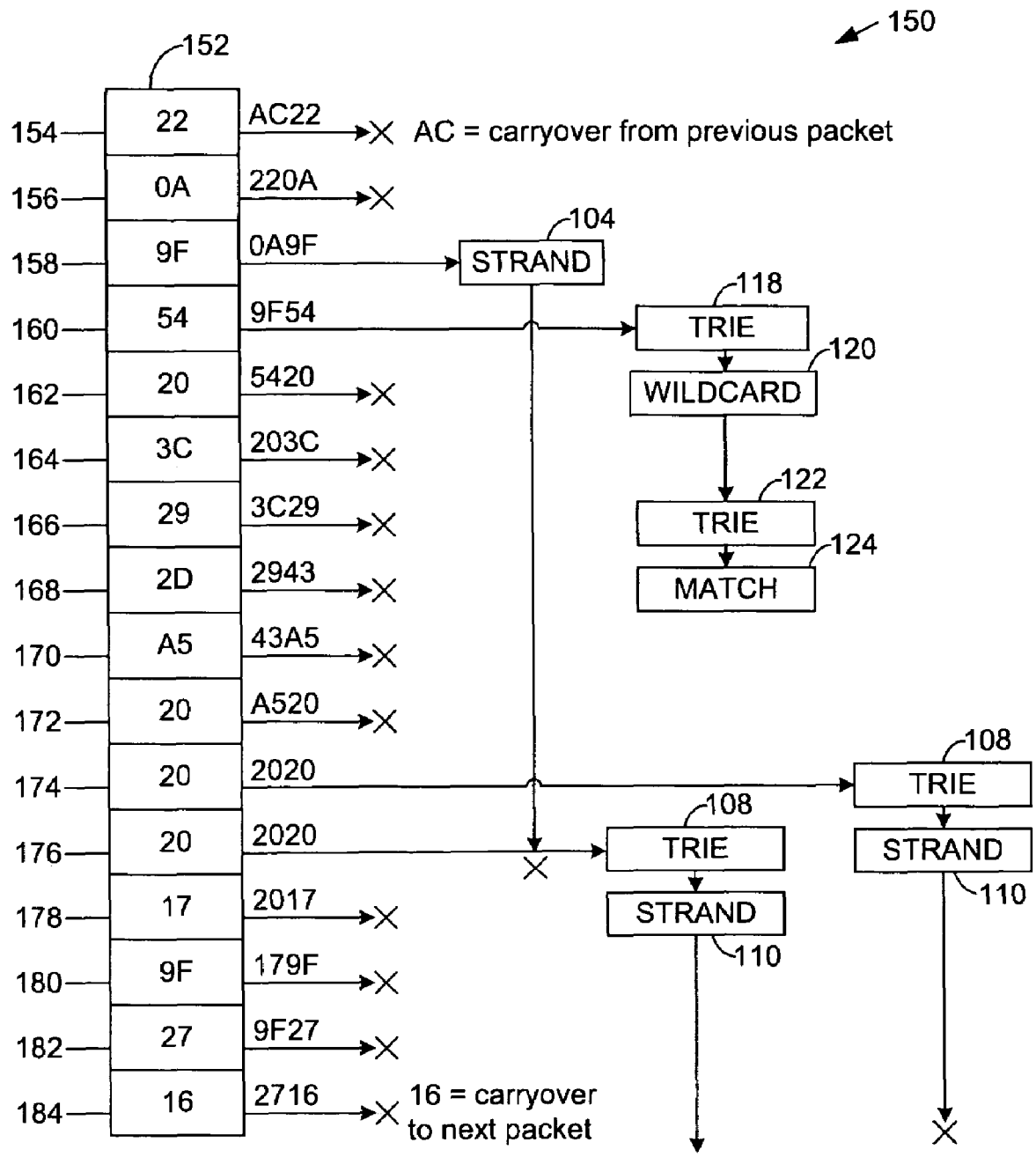
FIG. 2 illustrates an embodiment of a data stream search.

FIG. 2 illustrates an embodiment of a data stream search 150 to be searched in the search table 100 for the four predefined patterns. The data stream search 150 includes a data stream 152 that may be received at a node and searched for embedded patterns that match one or more of the four example predefined patterns provided above. At 154, the byte 22 is incident in the data stream 152 and combined with the previous byte received, AC. The sequence AC22 does not match any of the predefined patterns defined in the root table 102 and so no further searching of that pattern is performed. Similarly, at 156, the byte 0A is incident in the data stream 152 and combined with the previous byte received, 22. The sequence 220A does not match any of the predefined patterns defined in the root table 102 and so no further searching of that sequence is performed either.

At 158, the byte 9F is encountered and combined with the previous byte 0A to form 0A9F. That sequence matches one of the flagged patterns in the root table 102 and, accordingly, a search of the following bytes in the data stream 102 begins. As may be seen at 104 on FIG. 1, after the string 0A9F is encountered, a strand sub-table performs a message digest function on the nine bytes following the sequence of bytes that matches the flagged pattern. In addition to collecting the next nine bytes of information for the strand sub-table 104, the characters in the data stream 152 may also be searched for other matching strings. Thus, at 160, the byte 54 is encountered next in the data stream 152 and combined with the 9F previously encountered to form 9F54. That sequence also matches one of the flagged patterns in the root table 102 and, accordingly, a search of the characters following that 9F54 string in the data stream 102 is performed concurrently with the search initiated in connection with the 0A9F sequence.

As may be seen at 118 on FIG. 1, after the string 9F54 is encountered, a trie sub-table checks the following byte to see whether it has the value 20. Thus, at 162, three different possible matches are searched. First, the input value 20 is combined with the previous input byte to form 5420. That string does not match any of the flagged patterns in the root table 102 and so no new search is begun beginning with the string 5420. Second, the 20 meets the criterion of 118 by being not less than the minimum value of 20 and not more than the maximum value of 20, and in this case matching the minimum and maximum amounts listed in the trie sub-table 118. Therefore, the trie sub-table 118 links to the wildcard sub-table 120 and permits the next two bytes of information in the data stream 152 to pass without being tested for a match. Third, the collection of received characters that began with the link to the strand sub-table 104 continues.

At 164 to 172, additional characters are retrieved from the data stream 152, none of which, when paired with the previous bytes, matches any of the flagged patterns of the root table 102. With regard to the match that began with the processing of the bytes 0A9F at 158, the strand sub-table 104 is continuing to receive characters through 172.

With regard to the match that began with the processing of the bytes 9F54 at 160, however, at 166 the bytes 3C29 that were not to be matched in accordance with the wildcard sub-table 120 have been received and a link is made to the trie sub-table 122. Thus at 168, 2D is received and matches the 2D of the trie sub-table 122. The trie sub-table 122 links to the match sub-table 124 after a match is found to the trie sub-table 122 and a match to predefined pattern four has been identified.

At 174, a 20 is received from the data stream 152 and combined with the 20 received at 172 to arrive at 2020, which is a match to a flagged pattern in the root table 102. Accordingly, at 174 a link is made to the trie sub-table 108 where a search for the byte 41 is performed on the following byte that is received at 176 which, if matched, would cause a link to the strand sub-table 114 and, simultaneously, the byte received at 176 is skipped through a wildcard function of the trie sub-table 108 and linked to the strand sub-table 110. The byte received at 176 is 20 so that no match to 41 is made and strand sub-table 114 is not linked. The strand sub-table 110, however, is linked because any byte value causes the trie sub-table 108 to link to the strand sub-table 110.

Also at 176, the received byte 20 is combined with the received byte 20 from 174 and, again, a match to flagged pattern 2020 in the root table has been received. Another link to the trie sub-table 108, therefore, is made after the 20 is received at 176.

Moreover, at 176, the strand sub-table 104 has received its nine bytes of information and performs its message digest function on the nine bytes. That message digest function may be any function that produces a sequence of values that is generally shorter than the sequence of values entered into the function. For example, a check sum type of function or a Cyclical Redundancy Check (CRC) type function or another type of function such as MD5 or SHA-1 may be used. As was previously discussed, a match may be found only if the result of the message digest function performed on the nine bytes results in the same value as the pre-calculated message digest value contained in the strand sub-table 104. In the example, the result is not equal to that pre-calculated message digest value, thus the string match that began at 156 and 158 with the receipt of the bytes 0A and 9F is terminated because the result of the pre-calculated message digest value in strand sub-table 104 fails to match the value of 2C3A42F7 from the strand sub-table 104 at 176.

At 178, 17 is received and combined with the 20 from 176 to arrive at 2017, which does not match any flagged pattern in the root table 102. In addition, the 17 is processed through the strand sub-table 110 for the search that was initiated by the 20 received at 172 and the 20 received at 174. The next three bytes received at 180-184 also do not match any flagged patterns in the root table 102 and so no new searches are begun by receipt of those bytes.

At 184, four bytes have been received since the strand sub-table 110 for the string that was initiated by the 20 received at 172 and the 20 received at 174 and so the message digest function is performed on that string of four bytes and the result is compared to the pre-calculated message digest value of F72C3A42 in strand sub-table 110 that indicates a match. In the example, the result of performance of the message digest function on those four bytes does not match the string F72C3A42, so no match is found and that search for a match is terminated.

At 184, only three bytes have been received since the strand sub-table 110 for the string that was initiated by the 20 received at 174 and the 20 received at 176, so an additional byte will have to be received to determine whether a match exists in that search. Searching may continue on all data received in a manner similar to that described in connection with the data stream 152 illustrated at 154-184.

An embodiment of an article of manufacture may include a computer readable medium having stored thereon instructions which, when executed by a processor, cause the processor to search a data stream for a sequence of bytes matching a predefined pattern. In an embodiment, the computer readable medium may also include instructions that cause the processor to apply a message digest function to a sequence of bytes and compare the result as has been described in connection with a strand sub-table.

Figure 3:
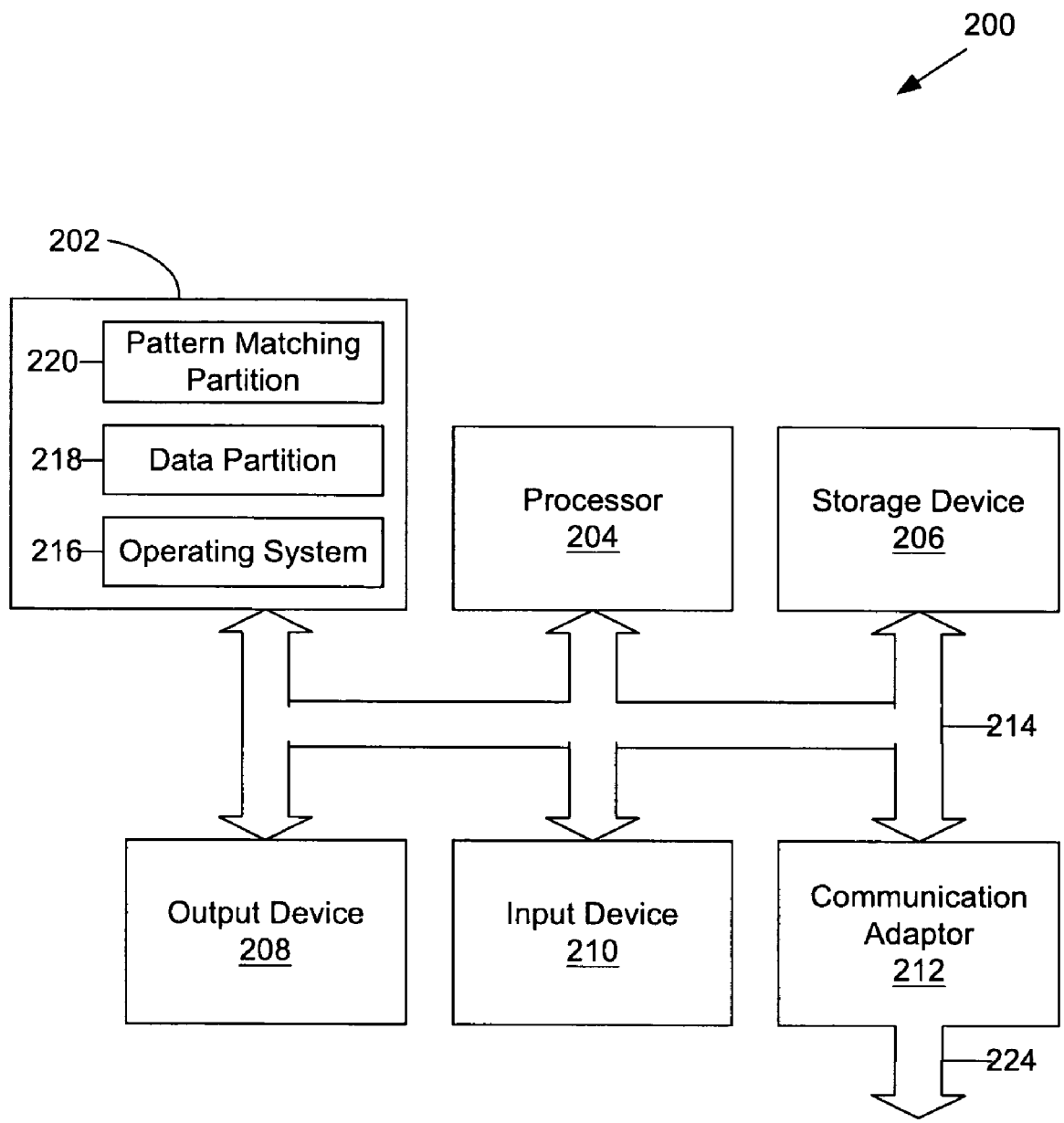
FIG. 3 illustrates an embodiment of a pattern matching device.

FIG. 3 illustrates an embodiment of a pattern matching device 200 that may search for a matching pattern in a data stream such as the data stream 152 illustrated in FIG. 2. The pattern matching device 200 includes memory 202, a processor 204, a storage device 206, an output 208, an input 210, and a communication adaptor 212. Communication between the processor 204, the storage device 206, the output 208, the input 210, and the communication adaptor 212 is accomplished by way of a communication bus 214.

It should be recognized that any or all of the components 202-212 of the pattern matching device 200 may be implemented in a single machine. For example, the memory 202 and processor 204 might be combined in a state machine or other hardware based logic machine.

The memory 202 may, for example, include random access memory (RAM), dynamic RAM, and/or read only memory (ROM) (e.g., programmable ROM, erasable programmable ROM, or electronically erasable programmable ROM) and may store computer program instructions and information. The memory may furthermore be partitioned into sections in which operating system 216 instructions are stored, a data partition 218 in which data is stored, and a pattern matching partition 220 in which instructions for carrying out pattern matching are stored. The pattern matching partition 220 may store program instructions and allow execution by the processor 204 of the program instructions. The data partition 218 may furthermore store data such as bytes from the data stream and matches to strand sub-tables to be used during the execution of the program instructions.

The processor 204 may execute the program instructions and process the data stored in the memory 202. In one embodiment, the instructions are stored in memory 202 in a compressed and/or encrypted format. As used herein the phrase, "executed by a processor" is intended to encompass instructions stored in a compressed and/or encrypted format, as well as instructions that may be compiled or installed by an installer before being executed by the processor 204.

The storage device 206 may, for example, be a magnetic disk (e.g., floppy disk and hard drive), optical disk (e.g., CD-ROM) or any other device or signal that can store digital information. The communication adaptor 212 permits communication between the pattern matching device 200 and other devices or nodes coupled to the communication adaptor 212 at the communication adaptor port 224. The communication adaptor 212 may be a network interface that transfers information from nodes on a network to the pattern matching device 200 or from the pattern matching device 200 to nodes on the network. The network may be a local or wide area network, such as, for example, the Internet, the World Wide Web, or the network 250 illustrated in FIG. 4.

It will be recognized that the pattern matching device 200 may alternately or in addition be coupled directly to one or more other devices through one or more input/output adaptors (not shown).

The pattern matching device 200 may also be coupled to output devices 208 such as, for example, a monitor or printer (not shown), and various input devices 210 such as, for example, a keyboard or mouse (not shown). It will be recognized, however, that the pattern matching device 200 does not necessarily need to have any or all of those output devices 208 or input devices 210 to operate. Moreover, other components of the pattern matching device 200 may not be necessary for operation of the pattern matching device 200. For example, the storage device 206 may not be necessary for operation of the pattern matching device 200 as all information referred to by the pattern matching device 200 may, for example, be held in memory 202.

The elements 202, 204, 206, 208, 210, and 212 of the pattern matching device 200 may communicate by way of one or more communication busses 214. Those busses 214 may include, for example, a system bus, a peripheral component interface bus, and an industry standard architecture bus.

A network in which pattern matching may be implemented may be a network of nodes such as, computers, telephones, or other, typically processor-based, devices interconnected by one or more forms of communication media. The communication media coupling those devices may include, for example, twisted pair, co-axial cable, optical fibers and wireless communication methods such as use of radio frequencies. A node performing pattern matching may receive the data stream 152 from another node coupled to a PSTN, the Internet, a Local Area Network (LAN), a Wide Area Network (WAN), or another network.

Network nodes may be equipped with the appropriate hardware, software or firmware necessary to communicate information in accordance with one or more protocols, wherein a protocol may comprise a set of instructions by which the information is communicated over the communications medium.

Figure 4:
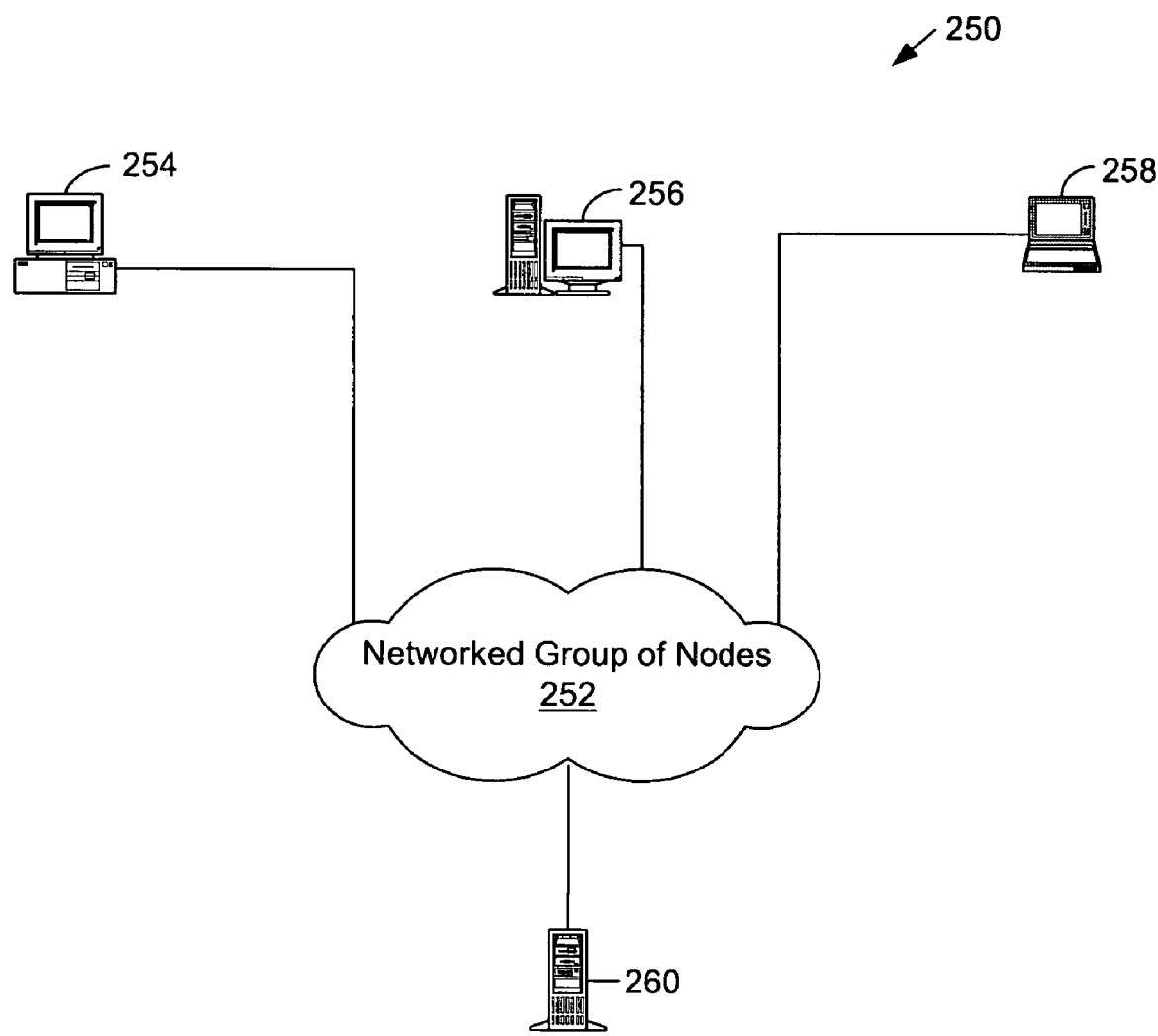
FIG. 4 illustrates an embodiment of network in which an embodiment of pattern matching may take place.

FIG. 4 illustrates an embodiment of a network 250 in which pattern matching may take place. The network may include a networked grouping of nodes 252 such as a Local Area Network (LAN), a Wide Area Network (WAN), the Internet, or a telephone network such as a Public Switched Telephone Network (PSTN) or a Private Branch Exchange (PBX).

The network 250 may include a pattern matching node 254 receiving a data stream such as the data stream 152 illustrated in FIG. 2 from a second node such as the nodes 256, 258, and 260 coupled to the networked grouping of nodes 252.

Figure 5:
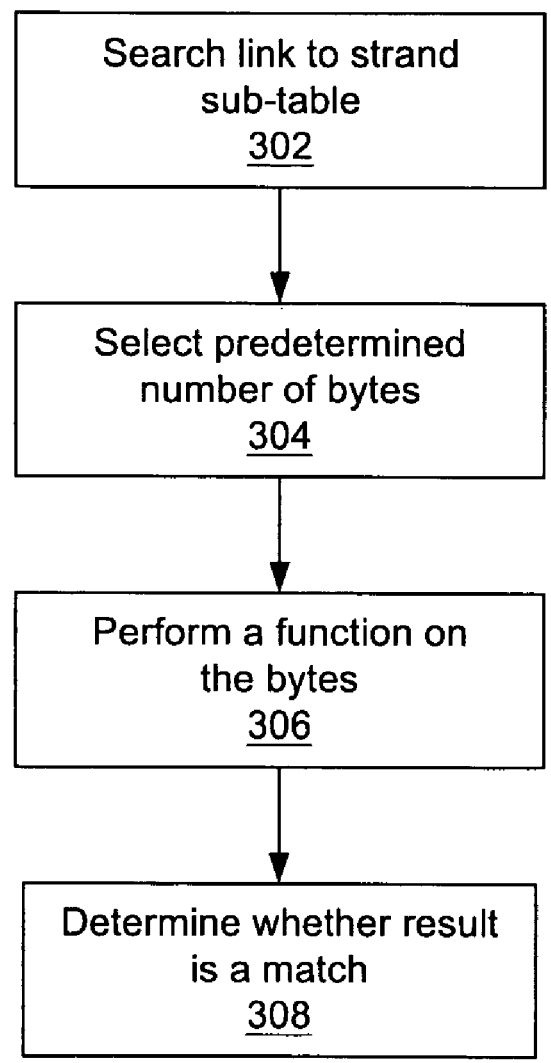
FIG. 5 illustrates an embodiment of a method of utilizing a "strand" sub-table to search a data stream for a sequence of bytes that match a predefined pattern.

FIG. 5 illustrates an embodiment of a method of utilizing a strand sub-table to search a data stream for a sequence of bytes that match a predefined pattern 300. At 302, a search for a match is linked to a strand sub-table. At 304, a predetermined number of characters are received from, for example, a data stream. At 306, a message digest function is taken of the received bytes, resulting in a sequence of bytes that is typically shorter than the sequence of received bytes. At 308, the result of the message digest function performed on the retained characters is compared to one or more predefined pattern to determine whether there is a match between the result and one of the predefined patterns.

In a trie sub-table a comparison is typically performed on every group of bits, in the example a byte, and that comparison may require a memory access, whereas by using a strand sub-table a comparison is typically performed only after the group of characters involved in the strand have been received and the message digest function has been performed on that group of characters. Thus, a significant reduction in memory accesses may be achieved by use of the strand sub-table. The result may include bytes that may be, for example, viewed as hexadecimal values. A match may require that the hexadecimal values of the result are identical to the hexadecimal values of the predefined pattern and in the same order.

In an embodiment, a particularly long sequence of bytes may be divided amongst two or more strand sub-tables and the method of using a strand sub-table 300 may be repeated. In that way, a mismatch may be recognized early, for example when the result of the first strand is compared to the matching string, and the search for a match to that string terminated early. Dividing a string into two or more strand sub-tables, however, increases the number of memory reads that may be required in a match so that a balance between a desired number of memory accesses and a desired number of characters to be retained in a strand may be determined by the user of the strand sub-table.

While the systems, apparatuses, and methods of pattern matching have been described in detail and with reference to specific embodiments thereof, it will be apparent to one skilled in the art that various changes and modifications can be made therein without departing from the spirit and scope thereof. Thus, it is intended that the modifications and variations be covered provided they come within the scope of the appended claims and their equivalents.

What is claimed is:

1. A method for searching for a match to a sequence of bits, comprising:
    selecting a predetermined number of bits from a data stream received via a communication adaptor;
    applying a message digest function to the selected bits;
    determining whether a pattern of bits resulting from the application of the message digest function to the selected sequence of bits matches a predefined pattern stored in a search table, the search table including at least one entry pointing to a sub-table of the search table;
    facilitating communication with a remote device via the communication adaptor in accordance with a matched pattern of bits in the received data stream;
    comparing the selected bits from the data stream to a second predefined pattern stored in the search table when the resulting pattern of bits matches the predefined pattern; and
    identifying the selected bits from the data stream as a match when the selected bits from the data stream match the second predefined pattern, wherein the search table includes: a root table; at least one trie sub-table; at least one strand sub-table; at least one match sub-table; and at least one wildcard sub-table.

2. The method of claim 1, wherein the number of bits in the pattern of bits resulting from the application of the message digest function to the selected bits is less than the number of selected bits.

3. The method of claim 1, wherein the selected bits are contiguous.

4. The method of claim 1, wherein the bits represent numbers.

5. The method of claim 1, wherein the bits represent hexadecimal numbers.

6. The method of claim 1, wherein the bits represent binary numbers.

7. The method of claim 1, wherein the bits represent non-numeric information.

8. The method of claim 1, wherein the resulting pattern of bits matches the predefined pattern when the resulting pattern of bits is identical to the predefined pattern and the bits of the resulting pattern of bits are in the same order as the bits of the predefined pattern.

9. The method of claim 1, further comprising comparing the resulting pattern of bits to a second predefined pattern to determine whether the resulting pattern of bits matches the second predefined pattern.

10. The method of claim 1, further comprising identifying the resulting pattern of bits as a match when the resulting pattern of bits matches the predefined pattern.

11. An article of manufacture, comprising:
a computer readable medium having stored thereon instructions which, when executed by a processor, cause the processor to perform a method of searching for a pattern in a data stream of bits received via a communication adaptor, the method comprising:
select a first set of bits including a predetermined number of bits from the data stream;
apply a message digest function to a value represented by the first set of bits;
determine whether the value resulting from the application of the message digest function to the first set of bits matches a predetermined value stored in a search table;
if the resulting value does match the predetermined value, access a portion of the search table linked to the predetermined value and continue the search in accordance with the linked portion of the search table;
if the resulting value does not match the predetermined value, select a second set of bits, subsequent to the first set of bits and including the predetermined number of bits, from the data stream and continue the search in accordance with the second set of bits;
facilitate communication with a remote device via the communication adaptor in accordance with a matched pattern of bits in the received data stream;
compare the selected bits from the data stream to a second predefined pattern stored in the search table when the resulting pattern of bits matches the predefined pattern; and
identify the selected bits from the data stream as a match when the selected bits from the data stream match the second predefined pattern, wherein the search table includes: a root table; at least one trie sub-table; at least one strand sub-table; at least one match sub-table; and at least one wildcard sub-table.

12. The article of manufacture of claim 11, wherein the first set of bits are contiguous.

13. The article of manufacture of claim 11, wherein the resulting value matches the predefined value when the bits of the resulting value are identical to the bits of the predefined value and the bits of the resulting value are in the same order as the bits of the predefined pattern.

14. A computer, comprising:
a communication adaptor coupled to a network of remote nodes to receive a data stream from at least one of the remote nodes; and
a processor coupled to the communication adaptor to:
select a predetermined number of bits from the data stream received via said communication adaptor;
apply a message digest function to the selected bits;
determine whether a pattern of bits resulting from the application of the message digest function to the selected bits matches a predefined pattern of bits stored in a search table, the search table including at least one entry pointing to a sub-table of the search table;
facilitate communication with a remote node via the communication adaptor in accordance with a matched pattern of bits in the received data stream;
compare the selected bits from the data stream to a second predefined pattern stored in the search table when the resulting pattern of bits matches the predefined pattern; and
identify the selected bits from the data stream as a match when the selected bits from the data stream match the second predefined pattern, wherein the search table includes: a root table; at least one trie sub-table; at least one strand sub-table; at least one match sub-table; and at least one wildcard sub-table.

15. The computer of claim 14, wherein the processor is further to compare the resulting pattern of bits to a second predefined pattern of bits to determine whether the resulting pattern of bits matches the second predefined pattern of bits.

16. The computer of claim 14, wherein the selected bits are contiguous.

17. The computer of claim 14, wherein the resulting pattern of bits matches the predefined pattern of bits when the bits of the resulting pattern are identical to the bits of the predefined pattern of bits and the bits of the resulting pattern of bits are in the same order as the bits of the predefined pattern of bits.

18. A node, comprising a processor to:
select a predetermined number of bits from a data stream received from a remote device via a communication network;
apply a message digest function to the selected bits;
determine whether a pattern of bits resulting from the application of the message digest function to the selected bits matches a predefined pattern of bits stored in a search table, the search table including at least one entry pointing to a sub-table of the search table;
facilitate communication with the remote node via the communication network in accordance with a matched pattern of bits in the received data stream;
compare the selected bits from the data stream to a second predefined pattern stored in the search table when the resulting pattern of bits matches the predefined pattern; and
identify the selected bits from the data stream as a match when the selected bits from the data stream match the second predefined pattern, wherein the search table includes: a root table; at least one trie sub-table; at least one strand sub-table; at least one match sub-table; and at least one wildcard sub-table.

19. The node of claim 18, wherein the processor is further to compare the resulting pattern of bits to a second predefined pattern of bits to determine whether the resulting pattern of bits matches the second predefined pattern of bits.

20. The node of claim 18, wherein the selected bits are contiguous.

21. The node of claim 18, wherein the resulting pattern of bits matches the predefined pattern of bits when the bits of the resulting pattern of bits are identical to the bits of the predefined pattern of bits and the bits of the resulting pattern of bits are in the same order as the bits of the predefined pattern of bits.

* * * * *